United States Patent [19]
Loh

[11] Patent Number: 6,121,695
[45] Date of Patent: Sep. 19, 2000

[54] MODULAR POWER SUPPLY

[75] Inventor: Pit-Kin Loh, Negeri Sembilan, Malaysia

[73] Assignee: Invetech Operations Pty. Ltd., Victoria, Australia

[21] Appl. No.: 09/051,622

[22] PCT Filed: Oct. 10, 1996

[86] PCT No.: PCT/AU96/00637

§ 371 Date: Oct. 23, 1998

§ 102(e) Date: Oct. 23, 1998

[87] PCT Pub. No.: WO97/14206

PCT Pub. Date: Apr. 17, 1997

[30] Foreign Application Priority Data

Oct. 11, 1995 [AU] Australia .................................. PN5920

[51] Int. Cl.[7] .................................................. H02J 7/00
[52] U.S. Cl. .............................................. 307/64; 307/65
[58] Field of Search ................................. 307/64–66, 69, 307/71, 80, 81, 44, 48, 52, 53, 85

[56] References Cited

U.S. PATENT DOCUMENTS

| | | | |
|---|---|---|---|
| 4,539,487 | 9/1985 | Ishii | 307/44 |
| 4,609,828 | 9/1986 | Small | 307/44 |
| 5,065,141 | 11/1991 | Whitsitt | 340/635 |
| 5,237,208 | 8/1993 | Tominaga et al. | 307/66 |
| 5,381,554 | 1/1995 | Langer et al. | 307/66 |
| 5,432,677 | 7/1995 | Mowatt et al. | 361/719 |
| 5,473,528 | 12/1995 | Hirata et al. | 307/66 |
| 5,616,968 | 4/1997 | Fujii et al. | 307/66 |
| 5,694,297 | 12/1997 | Smith et al. | 361/785 |
| 5,751,063 | 5/1998 | Baba | 257/723 |
| 5,790,374 | 8/1998 | Wong | 361/685 |

OTHER PUBLICATIONS

Patent Abstracts of Japan, JP 7–184322 A (Omro Corp) Jul. 21, 1995.

Patent Abstracts of Japan, E1476, p. 122. JP 5–227656 A (Koufu Nippon Denki K.K) Sep. 3, 1993.

Patent Abstracts of Japan, E–1528, p. 51, JP 5–336683 A (Nippon Electric Ind Co Ltd) Dec. 17, 1993.

Derwent Abstract Accession No. 91–198335/27, class X12, JP 03–124228 A (Toshiba KK) May 27, 1991.

*Primary Examiner*—Fritz Fleming
*Attorney, Agent, or Firm*—Blakely Sokoloff Taylor & Zafman

[57] ABSTRACT

A modular power supply (2) suitable for application as an uninterruptable power supply for use with electrical equipment such as computers. A module (6) of the power supply may include a battery (32), a charging circuit for the battery (34), a power supply circuit coupled to mains electricity and the battery (30, 36, 40), and a control circuit (38) for selectively providing power to the electrical equipment (12) by way of the power supply circuit from either mains electricity (10) or the battery as source. The module is also provided with a coupling which is adapted to connect the module in parallel with at least one other module. A housing may be provided to receive a plurality of modules, which are connected together in parallel by way of plugs and sockets when received in the housing. The plugs and sockets and the control circuit may be adapted to enable "hot-swapping" of the modules from the housing. The modules may also be interconnected in the housing by way of a control line (20) which enables communication of the modules for making a majority rules decision concerning the provision of power from the mains or battery on the basis of fluctuations in the electrical mains supply.

19 Claims, 12 Drawing Sheets

MODULAR POWER SUPPLY

BACKGROUND OF THE INVENTION

1. Field of the Invention

This invention relates to a modular power supply. A particular application of the invention relates to uninterruptable power supplies for connection, for example, between a mains power source and electrical equipment such as a computer apparatus.

2. Description of the Related Art

The power supply equipment, such as uninterruptable power supplies (UPS), are often used in coupling sensitive electrical apparatus, such as computer equipment, to a mains power source. An uninterruptable power supply coupled between the mains power sources and a computer is able to provide a source of power which is not subject to fluctuations in the mains power source and can provide power in the case of a power outage with respect to the mains source. The power handling capacity of the uninterruptable, power source must be matched to the power consumption of the electrical apparatus connected thereto, which can cause some difficulty if the electrical apparatus is upgraded or added to. For example, in a computer application where an uninterruptable power source is driving a local area network (LAN) server which requires 1 kilowatt of power, the uninterruptable power supply may be chosen to have a capacity of 1,200 va. If the LAN server is upgraded to a model which requires 1.5 kilowatts of power, then the UPS would need to be replaced with one with additional power handling capability.

BRIEF SUMMARY OF THE INVENTION

In accordance with the present invention, there is provided an uninterruptable power supply for receiving electrical power and supplying the electrical power to an electrical apparatus. The electrical apparatus includes a housing adapted to receive a plurality of uninterruptable power supply modules. At least one of the uninterruptable power supply modules includes an energy storage device and a charger which stores electrical power from the main power source in the energy storage device. A power supply is coupled to the main power source and the energy storage device and supplies electrical power to the electrical apparatus. A controller controls the power supply to selectively provide electrical power to the electrical power from the main electrical power source or from the energy storage device. The uninterruptable power supply module is coupled to the housing and each of the at least one uninterruptable power supply modules is coupled to operate in parallel with other uninterruptable power supply modules.

In one form of the invention, the coupling means comprises a plug or socket connector, and wherein the housing is provided with a plurality of reciprocal sockets or plugs with electrical interconnections therebetween. In this case, the housing is adapted to receive a plurality of the uninterruptable power supply modules, each module fitting into a respective docking bay and making connection with its coupling means to a respective socket or plug in the housing, wherein the modules connected in the housing are in a parallel circuit arrangement. The housing may include a mains power source input, and connections therefrom to each of the sockets or plugs for transmission to modules when connected to the housing. The housing may also include an electrical power outlet for passing electrical power to the electrical apparatus, with electrical connections between each of the sockets or plugs in the housing, to enable electrical power to pass from the power supply means, via the coupling means, of each module connected in the housing. In a preferred form of the invention, the housing includes a bypass circuit adapted to couple the mains power source input to the electrical power output in the absence of uninterruptable power supply modules connected to the housing.

In a preferred embodiment of the invention, the uninterruptable power supply modules are "hot pluggable" with the housing, meaning that a module can be connected or disconnected from the housing without interrupting the flow of electricity from the mains power source to a electrical apparatus coupled to the electrical power output. One of the features which aids in achieving this is a form of the coupling means which effects a sequential connection or disconnection of connections as between the housing and a module when the module is inserted or removed from the housing.

In one construction of the uninterruptable power supply module, the control means of a particular module is provided with a connection to the control means of each other module connected in parallel therewith by way of the coupling means. The interconnection of the control means allows a "majority rules" control system to be implemented whereby a binary signal output by each control means is processed to determine the signal state of the majority of the control means coupled in parallel, and the processed signal utilised to make a decision. For example, when a power fluctuation in the mains power source is detected by the control means of a module, that module outputs a control signal indicative of its detection, which is processed together with control signals from each other module connected in parallel. If the processed signal indicates that a majority of the modules have detected the power fluctuation, then the control means in all of the modules may act to supply power to the electrical apparatus from the energy storage devices rather than the mains supply power. In one form of the invention, the processing of the binary control signals is effected by means of an impedance network which "averages" the binary control signals from the modules, wherein a decision is made by the control means on the basis of whether the "averaged" output from the impedance network is greater than or less than a threshold value.

In the construction of an uninterruptable power supply module in accordance with an embodiment of the invention, it has been found advantageous to employ the use of a "power hybrid" in which electronic components which require dissipation of a substantial amount of heat are mounted on a ceramic substrate which is provided with laminated metal foil interconnection tracks. The electronic components which are mounted on the power hybrid. are preferably wire bonded to connection pads on the ceramic substrate, and then covered with a conformal coating, such as an epoxy resin. With the electronic components mounted on one side of the ceramic substrate, the other side of the ceramic substrate is preferably attached to a heat sink, such as a metallic plate. For improved space utilisation, a printed circuit board containing circuit components not requiring substantial heat dissipation is mounted in a facing relationship to the surface of the ceramic substrate, having electrical connections to the circuits of the power hybrid by way of wire terminal inserts.

Additional beneficial space utilisation may be achieved by employing relatively flat transformers in power conversion circuitry of the power supply means. The transformers are constructed utilising windings which are formed on a printed circuit board or stamped from a metallic foil material. The flat transformers are utilised, for example, in the conversion of one DC voltage level to another DC voltage level, and operate at approximately between 16 kilohertz and 20 kilohertz and have power ratings in excess of 500 watts.

The invention also provides a method of controlling an uninterruptable power supply, wherein a plurality of uninterruptable power supply modules are coupled in parallel, receiving as input a mains electricity source, coupled, in use to output electrical power to an electrical apparatus, and including energy storage means, comprising the steps of outputting a control signal from each of the uninterruptable power supply modules connected in parallel, processing the control signals from each of the uninterruptable power supplies so as to produce a majority control signal, and controlling each uninterruptable power supply module according to the majority control signal.

The invention further provides a method for providing an uninterruptable power supply to an electrical apparatus, comprising providing a housing containing a plurality of individually operable uninterruptable power supply modules, providing a power input in the housing for connection to a mains electricity, providing a power output in the housing for connection to the electrical apparatus, providing electrical energy storage means in at least one of the modules, providing parallel power bus connections in the housing for connection of the power input and power output to the individual modules, providing each of the modules with a sensing means for sensing a fluctuation in the mains electricity and outputting a corresponding alert signal, wherein alert signals received from each module are processed in the housing to produce a majority alert signal which is provided to each module, and wherein control circuits in the modules are responsive to control the supply of power to the power output from either the power input or the electrical energy storage means on the basis of the majority alert signal.

BRIEF DESCRIPTION OF THE SEVERAL VIEWS OF THE DRAWINGS

The invention is described in greater detail hereinafter, by way of example only, with reference to the accompanying drawings, wherein:

FIGS. 10A–D shows an isometric view and components of a flat transformer; and

DETAILED DESCRIPTION OF THE INVENTION

Figure 1:
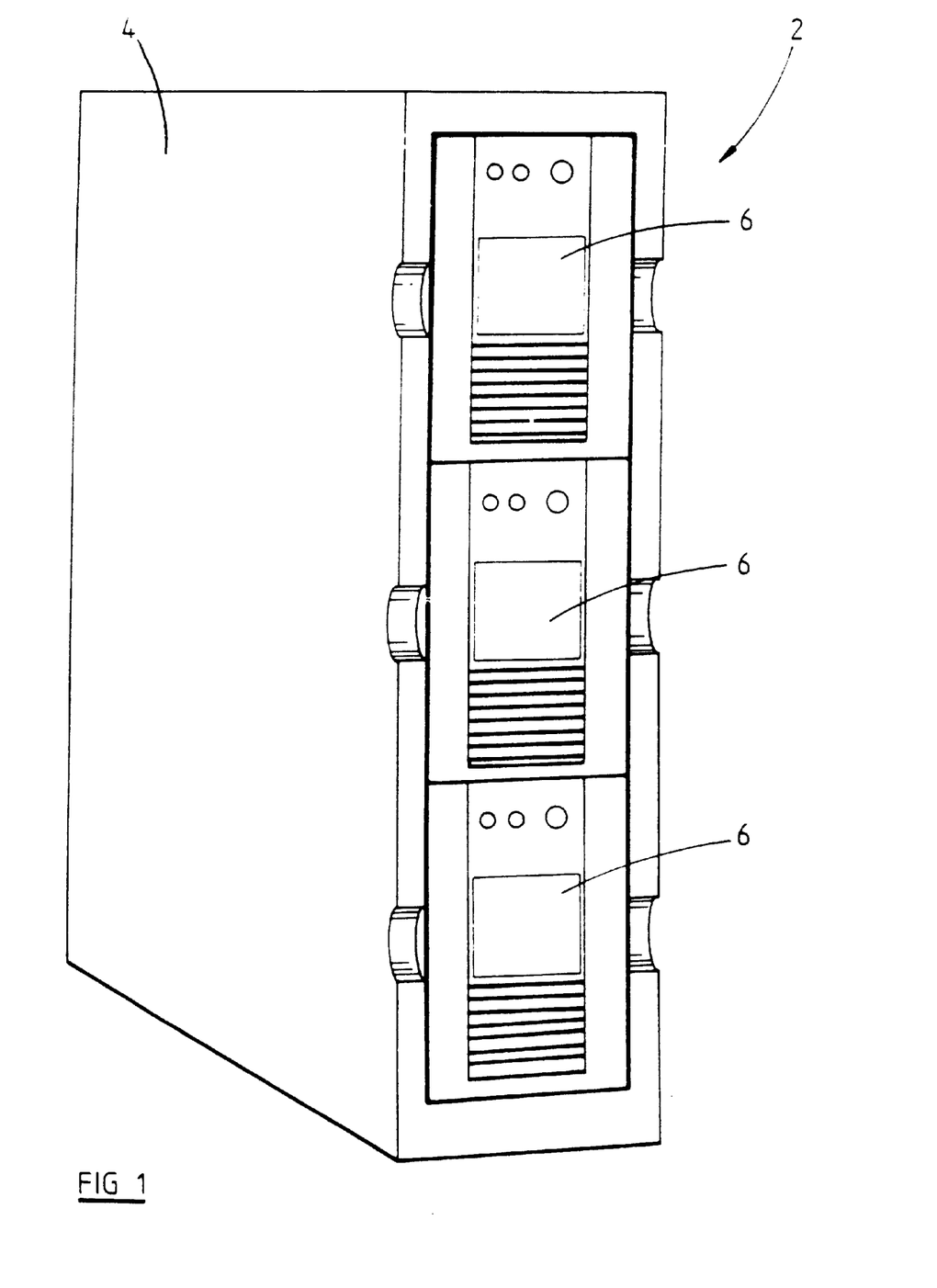
FIG. 1 is an illustrative view of an embodiment of the invention, showing a housing containing a plurality of uninterruptable power supply modules.

A modular uninterruptable power supply (UPS) 2 is illustrated in FIG. 1 comprising a housing 4 which is adapted to receive a plurality of uninterruptable power supply modules 6 therein. The housing 4 includes a plurality of docking bays which are each sized to receive a UPS module 6. The UPS 2 is for connection between an electrical apparatus, such as computer equipment, and a mains electrical power source which may be provided from, for example, an electrical wall socket. In use, electrical power is provided to the UPS 2 from the mains electrical power source, which passes through the UPS modules 6, connected in parallel, and to the electrical apparatus while the mains electrical power source operates normally. If an interruption, for example, occurs in the supply of electricity at the mains electrical power source, the UPS modules 6 then act to supply electricity to the electrical apparatus from energy storage devices, such as batteries, contained within the UPS modules 6. Thus, whilst the mains electrical power source operates normally, the UPS modules 6 also utilised an amount of power therefrom to charge the energy storage devices.

Figure 2:
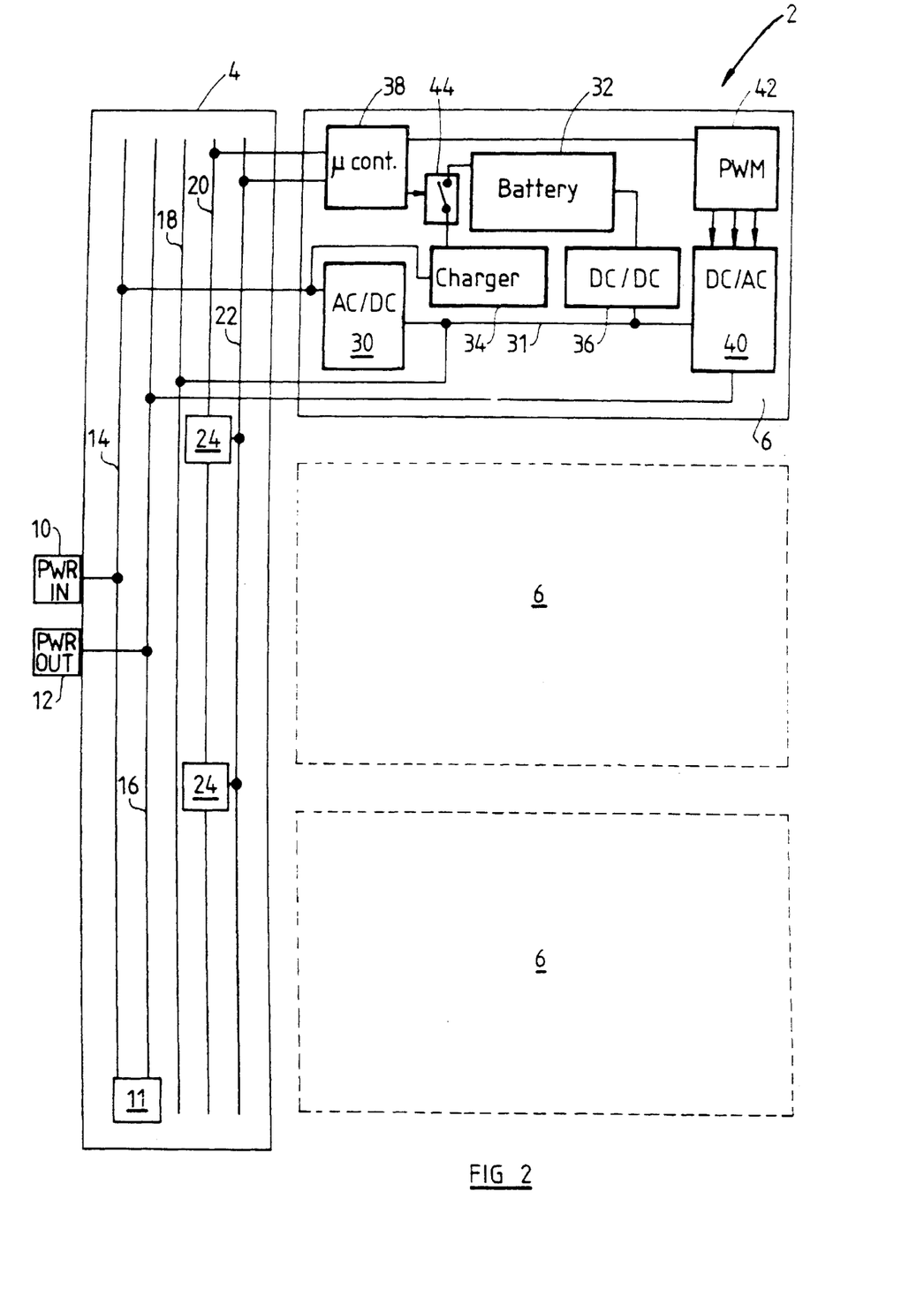
FIG. 2 is a schematic block diagram of circuitry for an uninterruptable power supply module and housing.

A block schematic diagram showing major components of the UPS 2 is illustrated in FIG. 2. The housing 4 is shown having an electrical power input 10 and electrical power output 12 coupled to internal input and output power busses 14, 16 respectively. A bypass circuit 11 couples the input and output power busses 14, 16 and is normally in a state whereby the input and output power busses are not electrically connected through the bypass circuit. The bypass circuit 11 includes a switch which is operable by the user and/or operated when all of the modules 6 in the housing are removed, to effect switching of the bypass circuit 11 to a state wherein the input and output power busses are directly coupled, bypassing the modules 6. For example, each docking bay may be provided with a sensing switch which is actuated when a UPS module is removed therefrom, with the sensing switches coupled in series, for example, the bypass circuit coupled thereto could then be actuated when all modules 6 were removed.

With the UPS module 6 installed in the housing 4, a connection is made from the power input bus 14 to an AC to DC converter 30 in the UPS module 6. The AC/DC converter 30 receives electricity from the input power bus 14, which is an AC electrical signal, such as a 50 hertz 240 volt electrical signal, and produces a relatively high voltage DC output on line 31. The high voltage line 31 is coupled back to a high voltage bus 18 in the housing 4 by way of diodes such that power can pass from the bus 18 to the line 31. The connection to high voltage bus 18 allows high voltage power to be supplied to the module 6 from a battery module (not shown) for additional backup time. A DC to AC converter 40 is also provided in the UPS module 6, having the high voltage DC electricity from line 31 as input, and producing an output AC electrical signal which is synchronised with the AC electricity on the input power bus 14. The output of the DC/AC converter 40 is coupled back to the output power bus 16 in the housing 4. The DC/AC converter 40 is controlled by way of a pulse width modulation circuit 42 which is operated by a control means 38 in the form of a micro controller. The micro controller operates under the control of stored instruction codes, however any suitable processing circuitry can be used for the control means 38, such as a dedicated custom or semi-custom logic array circuit. Whilst the electricity provided to the mains electrical power input 10 maintains its signal level, the electrical power passes from the input power bus 14 through AC/DC converter 30, DC/AC converter 40 and back to the output power bus 16. This operation takes place in each of the UPS modules 6 installed in the housing 4, in a parallel fashion.

The UPS module 6 also includes an energy storage device in the form of a battery 32. A charging circuit 34 is coupled to receive electrical power from the input power bus 14, and is coupled to the battery 32 by way of a switch 44, such that when a normal signal level is maintained on the input power bus 14, electrical power is restored in the battery 32 by the charger 34, if required. A DC to DC voltage level changer circuit 36 is coupled between the battery and the high voltage line 31. The battery 32 may operate, for example, at a level of about 12 volts DC, as is common for lead acid type batteries, whereas the high voltage line 31 may be of the order of 350 volts DC. Thus, the charger 34 steps down the DC voltage from the high voltage line 31 so as to be compatible with battery 32, whilst the AC/DC voltage converter 36 steps up the DC voltage from the battery. If a power fluctuation occurs in the mains electrical power source supplied to the input power bus 14 this is detected by the microcontroller 38, which outputs a control signal on a control line bus 20 in the housing 4. The control line bus 20 is coupled to control signal processing circuitry 24 and thence to another control bus 22. The control signal processing circuitry 24 receives control signals from the microcontrollers in each UPS module 6 installed in the housing 4 and produces an output control signal on control bus 22 on the basis of the signals received from each module 6. If a majority of the microcontrollers 38 output a signal on control bus 20 indicative of a mains electrical power source fluctuation, the resulting signal on bus 22 causes the microcontroller 38 in each UPS module 6 to control the respective switch 44 so as to disconnect the battery 32 from charger 34. If a minority of microcontrollers 38 output a power fluctuation signal on bus 20 then the signal resulting on bus 22 indicates to the microcontrollers that power is not required to be supplied from batteries, and the mains electrical power source continues to supply the output power bus. Thus, during the mains electrical power source fluctuation or outage, electrical power is supplied from the battery 32 to the high voltage line 31 by way of the AC/DC voltage converter 36, so as to supply to output power bus 16 through the DC/AC converter 40 in each installed UPS module 6.

Although the uninterruptable power supply 2 illustrated in FIGS. 1 and 2 comprises a housing containing only three UPS modules, a housing accommodating many more UPS modules, such as 6, 12, 50 or more may be constructed, with all of the UPS modules 6 operating in parallel and the microcontrollers 38 therein operating on a majority rules decision making process as outlined above. Alternatively, a single UPS module 6 can operate in isolation with being coupled to a housing 4, but instead being coupled directly to the mains electrical power source as input and the electrical apparatus as output.

Figure 3:
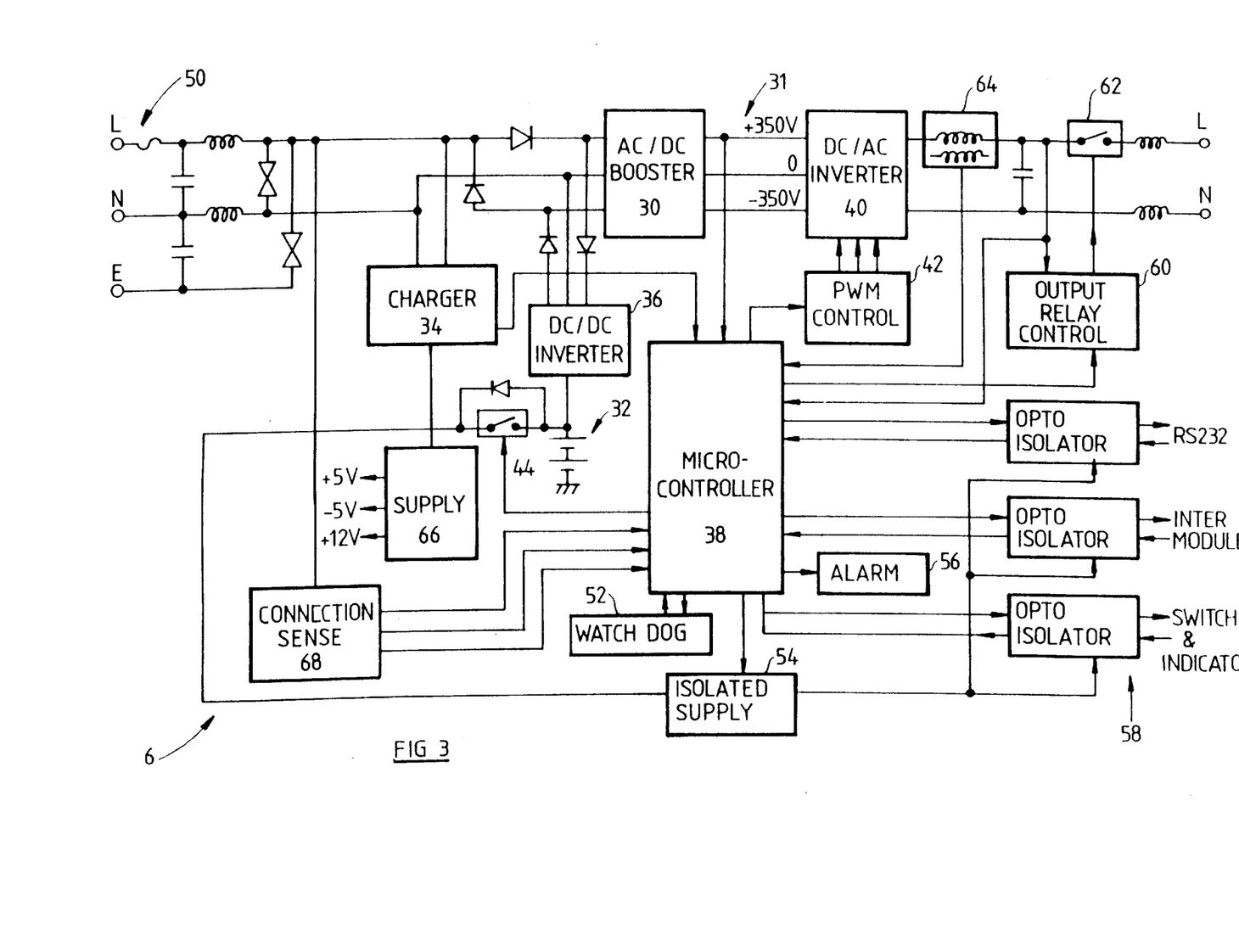
FIG. 3 is a more detailed schematic block diagram of circuitry for a UPS module.

A more detailed schematic block diagram of circuitry contained in an uninterruptable power supply module 6 is shown in FIG. 3. The connections 50 for receiving mains input power are shown at the left hand side of the Figure, including line, neutral and earth connections. The mains power input connections 50 may be derived either from a coupling to a housing 4, as outlined above, or from a direct connection to a mains electrical power source such as a conventional wall socket. The mains AC electrical power is input via rectifying diodes to an AC/DC booster 30 which produces a relatively high voltage DC output of +350 volts, −350 volts on high voltage lines 31. A charger circuit 34 is coupled to receive electrical power from the mains power input connections, and produces a 12 volt output for charging the batteries 32. The connection between the charger 34 and batteries 32 is regulated by a switch 44 which is controlled from the microcontroller 38, The batteries 32 are also coupled to a DC/DC inverter 36 which receives the 12 volt battery voltage as input, and produces an output compatible with the high voltage DC lines 31. A DC/AC inverter 40 is also coupled to the high voltage DC lines 31, for producing an AC voltage output compatible with the mains voltage input received at the input connection 50. The DC/AC inverter 40 is controlled by a pulse width modulation (PWM) control circuit 42 which itself is controlled from the microcontroller 38.

The microcontroller 38 is of conventional construction, and may comprise, for example, a microprocessor circuit, input/output circuitry, and non-volatile memory storing instruction codes for controlling the microprocessor circuit. A watchdog circuit 52 is coupled to the microcontroller 38, and periodically interrogates the microcontroller to determine continuing normal operation. If the watchdog circuit 52 detects faulty operation of the microcontroller during an interrogation, then the watchdog circuit 52 acts to reset the microcontroller 38, or raise an alarm via an alarm circuit 56.

The microcontroller circuit 38 receives sense inputs from the mains input power source at connections 50 by way of a connection sense circuit 68, which provides to the microcontroller signals indicative of an AC electrical supply present at the connection 50, and synchronisation signals in accordance with the AC mains electricity. Sense inputs are also provided to the microcontroller from the charger 34, the high voltage DC line 31, the current output from the DC/AC inverter 40 by way of a current sense transformer 64, the voltage output of inverter 40, as well as external control signals through opto-isolator circuits 58. The microcontroller 38 communicates with circuitry external to the UPS module 6 by way of the opto-isolators 58. One of the opto-isolators connects to an RS 232 standard communications connection, another opto-isolator provides intermodule communications between other UPS modules 6 when installed in a housing 4, whilst another opto-isolator provides connection to a switch and indicator lamp.

Figure 4A:
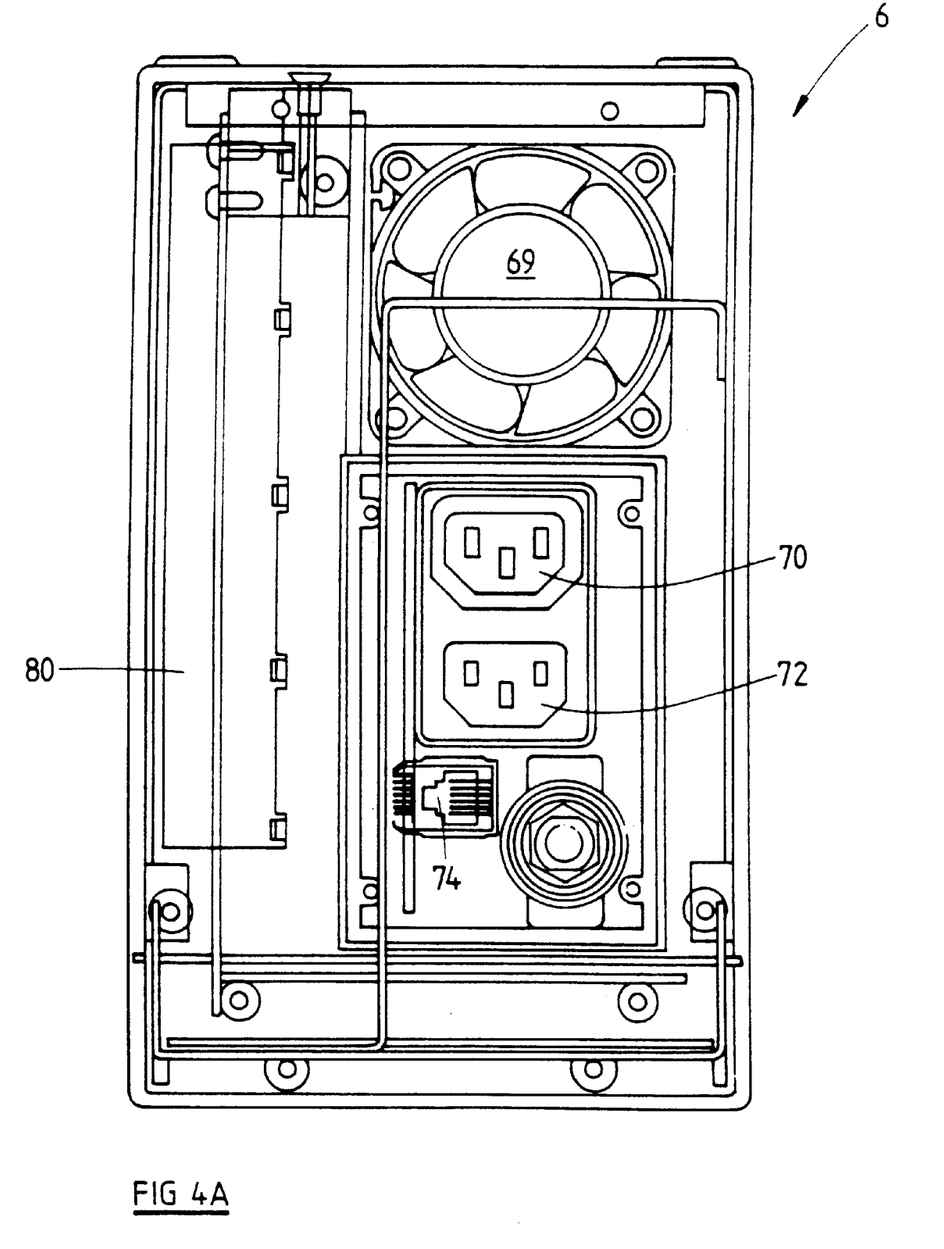
FIGS. 4A and 4B are rear and cross sectional views, respectively, of a UPS module.
Figure 4B:
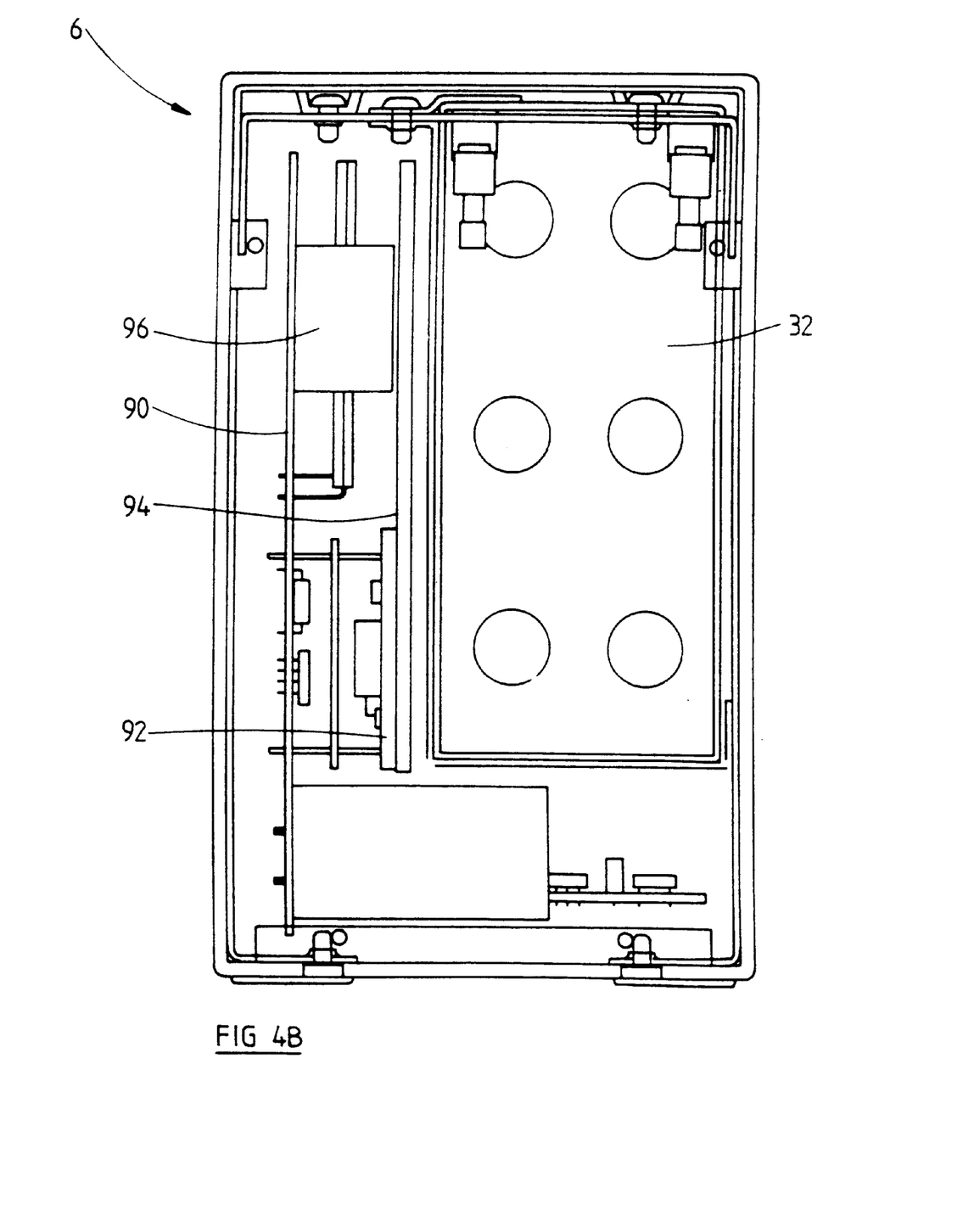

FIG. 4A shows a rear view of a UPS module 6 in a preferred physical form, and FIG. 4B illustrates a rear cross-sectional view of the module 6. The module 6 is contained in a generally rectangular box casing, the rear of which supports a cooling fan 69, an external power outlet plug 70, an external power inlet socket 72, and a communications port 74. A connector opening is also provided, covered by a hinged protective flap 80, which will be described in greater detail hereinbelow. When the UPS module 6 acts as a stand alone power supply, the external power input socket 72 is coupled to receive mains electricity to supply the mains electrical input connection 50 (FIG. 3), and the external electrical output plug 70 is, in use, coupled to the electrical apparatus. The communications jack 74 is provided to allow the microcontroller 38 of the UPS module 6 to communicate via its RS 232 communications port.

When the UPS module 6 is installed in a housing 4, the external plug and socket 70, 72 are not utilised, but connections are made to the circuitry of the UPS module through connections provided behind the protective flap 80 in the rear of the module.

FIG. 4B shows a rear cross-sectional view through the UPS module, illustrating the battery 32, alongside which are mounted a main circuit board 90, a power hybrid device 92 and heat sink plate 94. The construction of these portions of the UPS module 6 are described in greater detail in connection with FIG. 5.

Figure 5:
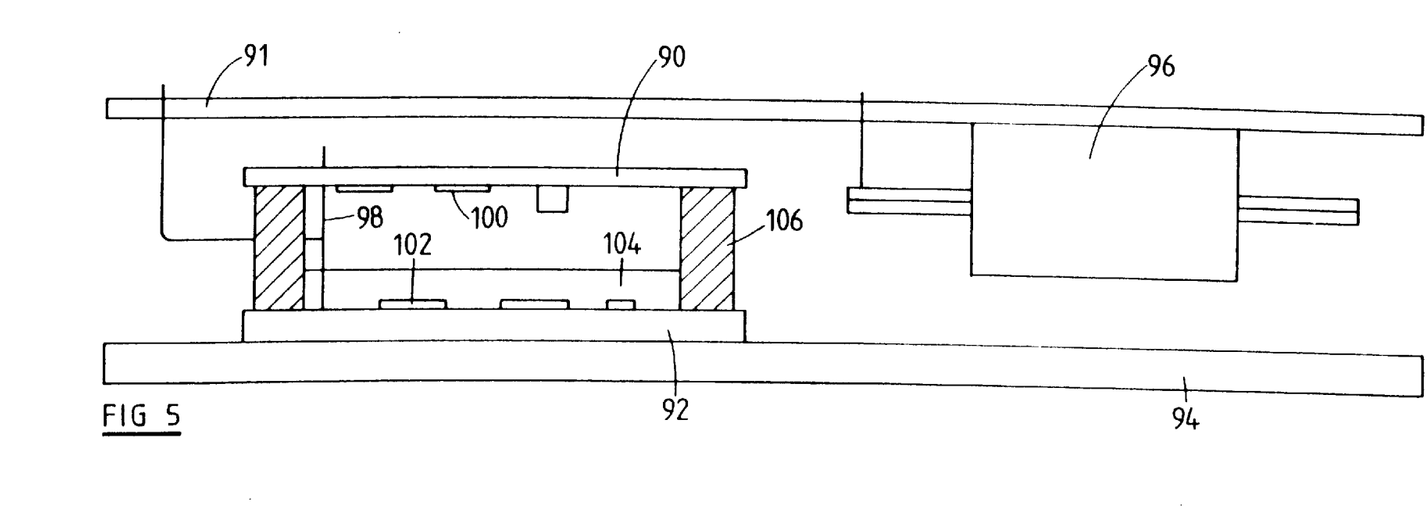
FIG. 5 is a cross sectional view showing a preferred construction of circuitry according to an embodiment of the invention.

The constructional layout of electronic components for an uninterruptable power supply module is illustrated in cross-section in FIG. 5, comprising principally a power hybrid 92, a main printed circuit board (PCB) 90, and a heat sink plate 94. An additional PCB 91 is also shown having a transformer 96 mounted thereon. The power hybrid 92 comprises a ceramic substrate having power electronic components 102 mounted thereon. A barrier structure 106 surrounds the power electronic components mounted on the ceramic substrate 92, and provides a means for holding wire terminals 98 which interconnect the power hybrid 92, PCB 90 and PCB 91. The barrier structure 106 also provides a peripheral barrier for applying a conformal coating 104 over the power electronic components 102 once mounted on the ceramic substrate, in order to protect the electronic components. The conformal coating 104 may comprise, for example, an epoxy resin. The barrier structure 106 also provides a convenient means by which the PCB 90, having circuit components 100 mounted thereon, to be attached in a facing relationship to the power hybrid 92. The underside of the power hybrid ceramic substrate is attached to a heat sink plate 94, which may comprise, for example, an aluminium plate, for dissipating heat generated by the power electronic components 102 mounted on the ceramic substrate. A transformer 96 is also shown mounted on the PCB 91, which is described in greater detail hereinbelow. The method of constructing the circuit arrangement shown in FIG. 5 is described below.

The ceramic substrate 92 is first prepared with copper pads in a conventional form for attaching power electronic components 102, such as integrated circuit dies to the surface of the ceramic substrate. A copper foil layer is then laminated with adhesive onto the substrate surface. The copper foil is etched to form copper tracks for carrying power signals between the electronic components 102. The power electronic dies 102 are then attached to the copper pads on the surface of the ceramic substrate 92 by soldering so as to attain good thermal transfer between the die 102 and ceramic substrate 92. Then the circuit contacts of the dies 102 are wire bonded to the copper tracks adhered to the substrate surface, in order to complete the circuit connections for the power electronics mounted on the power hybrid. The surface mounted components such as current sensing resistors and thermistors are also mounted on copper pads on the substrate. For example, a thermistor may be mounted on substrate 92 in order to detect an over temperature condition for the substrate.

The underside of ceramic substrate 92 is provided with a thin copper layer which is strongly attached to the substrate surface. This is used in order to attach the substrate 92 to the aluminium plate heat sink 94 by soldering. In order to achieve good bond between the thin copper layer on the underside of the substrate 92 and the aluminium plate 94, the aluminium plate is coated with nickel and tin so as to adhere well with solder.

The barrier structure 106, which is preferably an insulative material, such as a heat resistive plastics material, is attached to the ceramic substrate 92, surrounding the power electronic components 92 mounted thereon. The barrier structure 106 is provided with terminal connectors 98 which comprise wire connectors extending through the barrier structure 106 and having a portion transverse to the plane of the ceramic substrate 92, for making connection to copper tracks on the ceramic substrate as well as the plated through holes on the PCB 90, when mounted on the barrier structure. The terminal connectors 98 are attached to the copper tracks on the power hybrid by reflow soldering. The surface of ceramic substrate 92 within the barrier structure 106 is then covered with an epoxy resin, so as to protect the wire bonded power electronic components mounted thereon. Finally, the PCB 90 having circuits with components 100 and, for example, a transformer 96 already attached is mounted on the barrier structure 106 and connections made to the wire connectors 98 by wave soldering. Ends of the connectors 98 which extend through the barrier structure 106 are bent transverse to the PCB 90 for attachment to parallel PCB 91.

An advantage of this method of construction results from ceramic being used as a substrate which provides good electric insulation and thermal conductivity, whilst being substantially thermally matched to the electronic dies mounted thereon. An alternative is to use a polyamide or ceramic filled epoxy as an insulative layer between copper foil tracks and a metal base plate. Polyamide is a low cost material that has the disadvantage of low thermal conductivity. Epoxy material is more difficult to handle, but provides high thermal conductivity. The disadvantage of this alternative method is that the copper foil and base plate might exhibit different thermal expansion characteristics since the materials are different. If the same material is employed for the base plate as for the copper conduction tracks, then the cost of the construction is higher since the base plate (heat sink) needs to be thick enough for structural rigidity. The thermal expansion problems may not be so critical if the circuit components mounted on the power hybrid are packaged components such as a T0220 device, but in the case where bare integrated circuit dies are utilised as in the present instance, and wire bonded to the copper tracks, thermal stresses can damage the circuit components, which requires that mechanical stresses due to thermal expansion mismatching to be carefully addressed.

The described construction method also provides the advantage that water metered construction techniques can be employed for the entire circuit. The terminal connectors 98, for example, provide an L-shaped bend at portion abutting the power hybrid, which enables re-flow soldering to be employed, whilst straight ends of the terminal connector extend through plated through holes in the PCBs 90 and 91 to enable wave soldering.

Figure 6A:
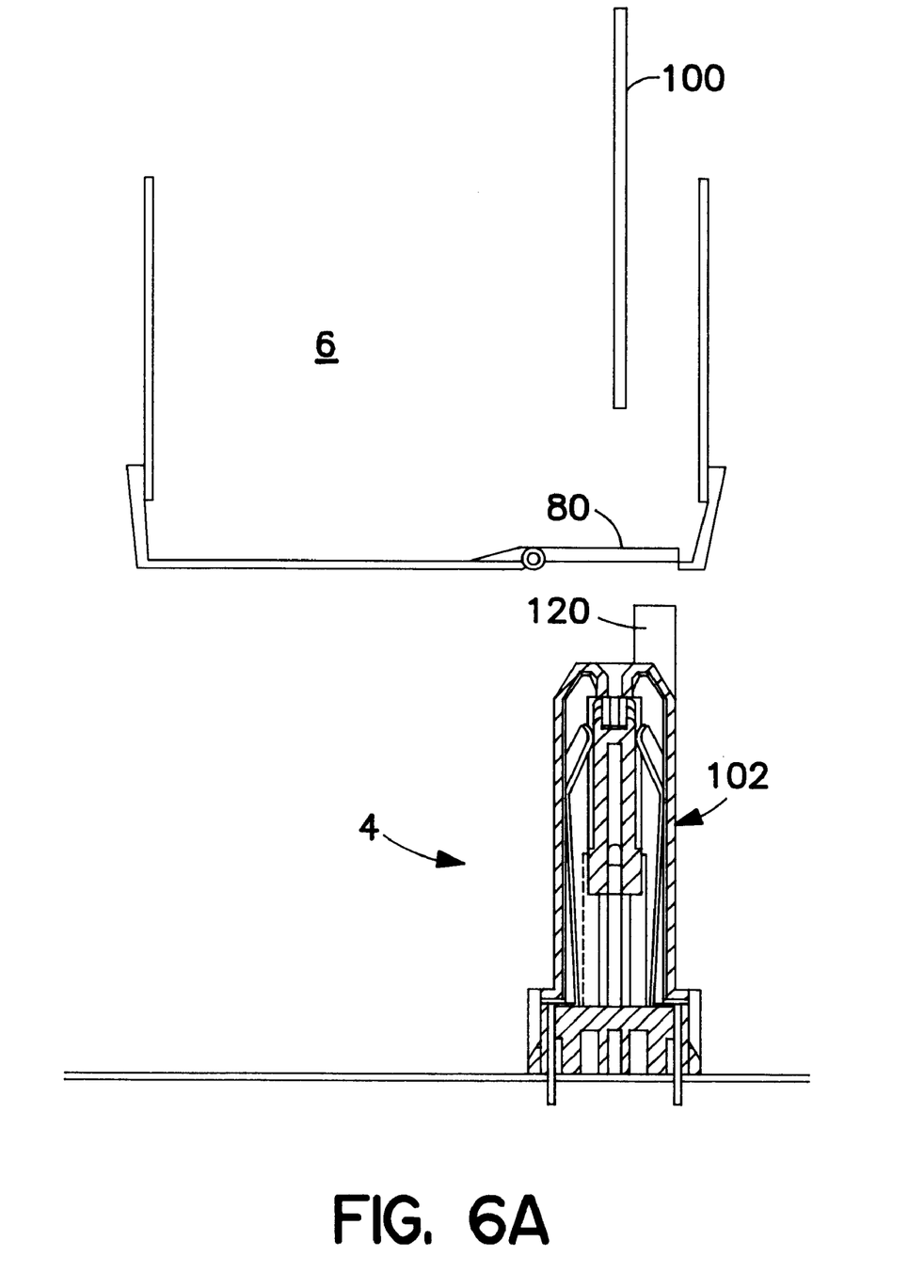
FIGS. 6A, 6B and 6C are cross sectional views illustrating a coupling between a UPS module and a housing.
Figure 6B:
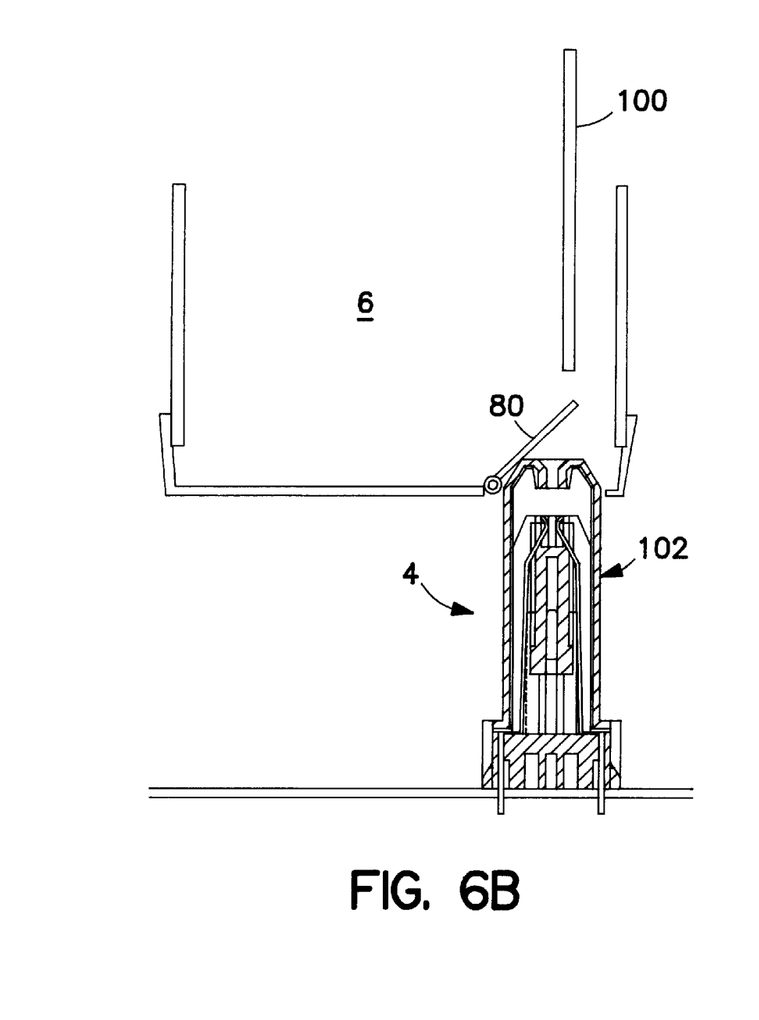
Figure 6C:
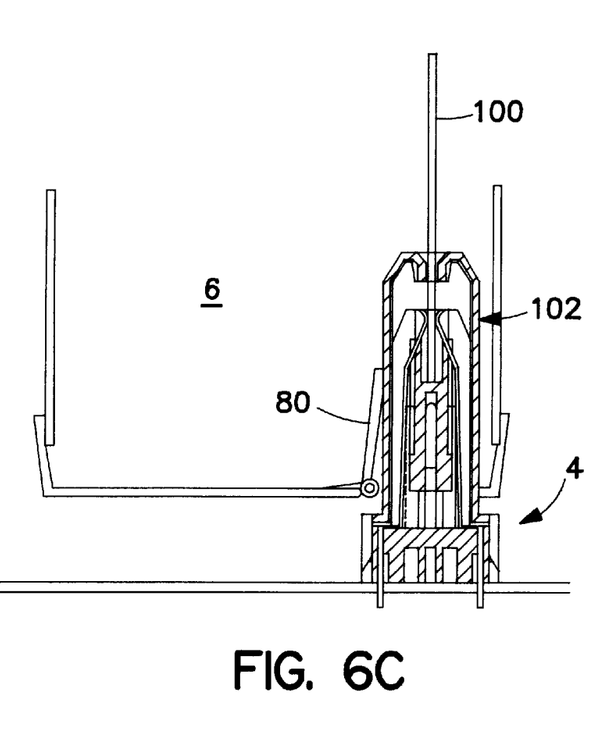
Figure 7A:
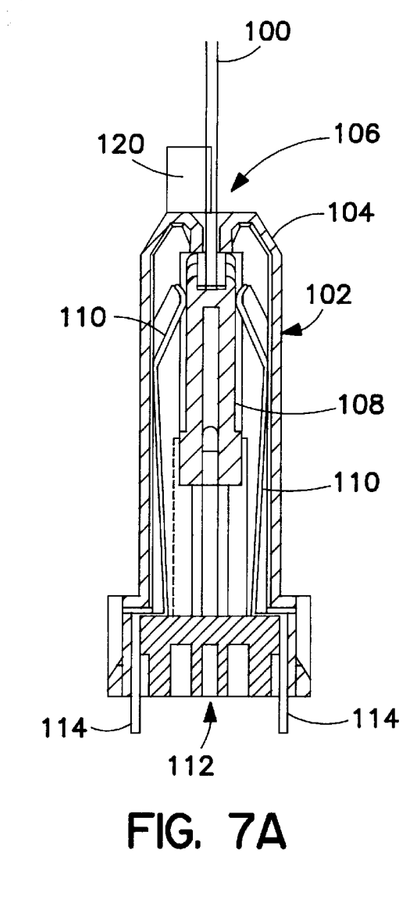
FIGS. 7a, 7b and 7c illustrate cross sectional views of a connector for connecting a UPS module to a housing.
Figure 7B:
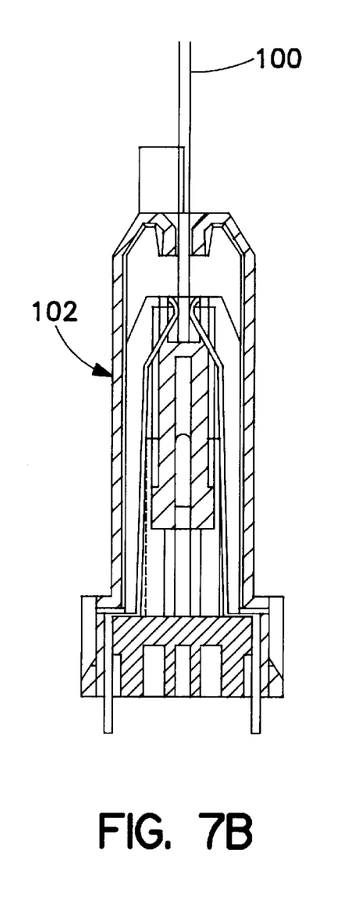
Figure 7C:
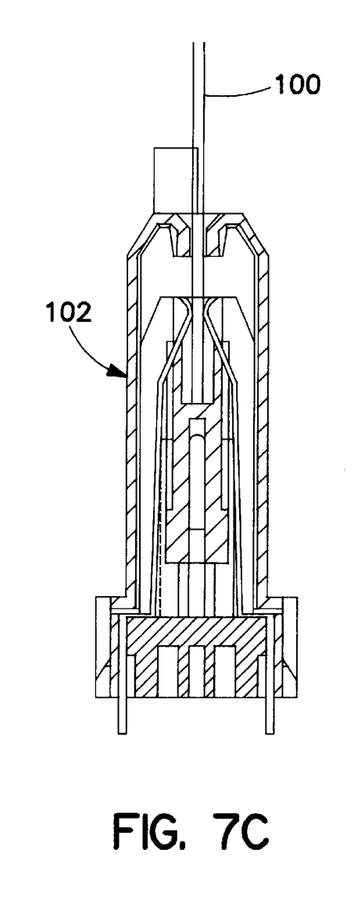
Figure 8:
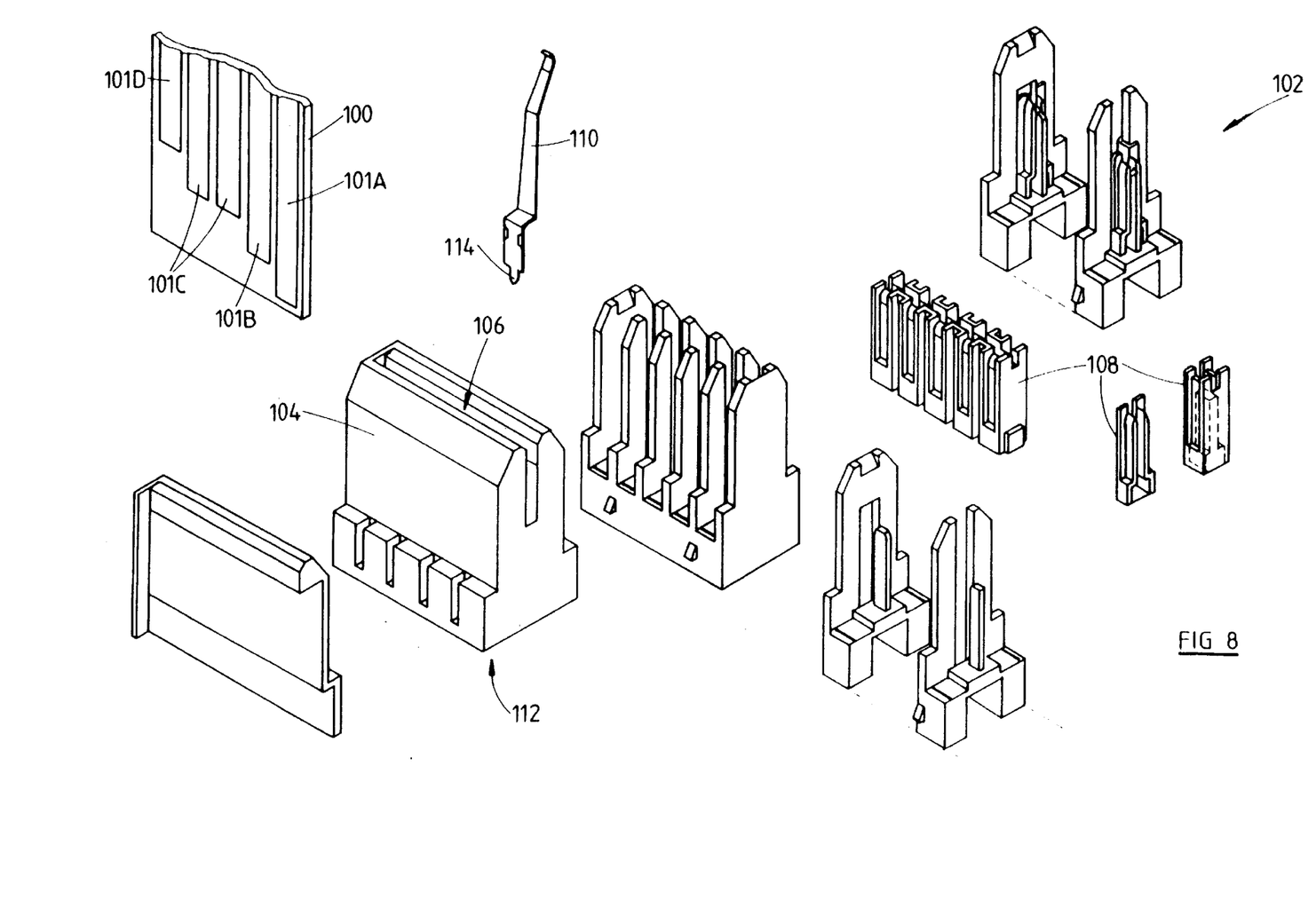
FIG. 8 shows exploded isometric views of components of the connector of FIG. 7.

Referring to now to FIGS. 6, 7 and 8, the means by which a UPS module 6 is coupled to a housing 4 is described. FIGS. 6A, 6B and 6C are cross sectional illustrations showing the connection process, wherein a UPS module 6 is installed in a docking bay of the housing 4, and a connector 100 and the UPS module makes electrical connection with a socket 102 in the housing 4. As mentioned in connection with FIG. 4A, a latched flap 80 is provided in the rear of the module 6 in order to shield the connector 100 in the module other than when a connection is made to the socket 102. As shown in the figures, the flap 80 is swiveled aside by the socket connector 102 as the module 6 is inserted into the housing 4, whilst the connector 100 extends into the socket 102 so as to make electrical connections therebetween. The socket connector 102 in the housing 4 is coupled to the busses 14, 16, 18, 20 and 22 (FIG. 2), whilst electrical tracks on the connector 100 in the module are coupled to the circuit component in the module 6. The connector 100 may comprise, for example, the portion of a printed circuit board, having conductive tracks formed on one or both sides thereof for making connection to respective contacts in the socket connector 102.

Referring to FIG. 7, a cross sectional view of a socket connector 102 is shown in various stages of insertion of a connector 100. The connector 102 comprises a plastic case 104 having a base 112 for mounting on a surface in the housing 4. At the end of the casing 104 opposite the base 112 there is provided an aperture 106 for receiving the connector 100 in the lengthwise direction of the socket 102. A slidable element 108 is contained within the casing 104, aligned with the aperture 106, and resiliently urged toward the aperture 106 by means of a spring (not shown). On each side of the slidable element 108 there are provided contact elements 110 which are formed so as to be resiliently urged towards the access of the socket connector 102, and having contact portions at an end thereof approximate the aperture 106. The other ends 114 of the contact elements 110 protrude from the base of the socket connector 102, for making connection to, for example, the busses illustrated diagrammatically in FIG. 2.

Without the connector 100 inserted in the socket 102, the slidable element 108 abuts adjacent the aperture 106, and separates the contact portions of the contact elements 110. As the connector 100 is inserted lengthwise through the aperture 106 of the socket 102, the slidable element 108 is pressed towards the base of the socket, which enables the contact portions of the contact elements 110 to move toward the connector 100 so as to contact the surface thereof. The contact elements 110 are thus able to make electrical connection to the tracks formed on the PCB forming the connector 100, which allows electrical signals to pass from the connector 100 through the ends 114 of the contact elements 110 thus to circuitry in the housing 4.

FIG. 8 illustrates exploded isometric views of portions forming the socket connector 102, which shows how a plurality of electrical connections can be made to tracks on a circuit board connector 100 by providing a row of contact elements 110 in slots in the socket connector 102.

Figures 9A, 9B, 9C:
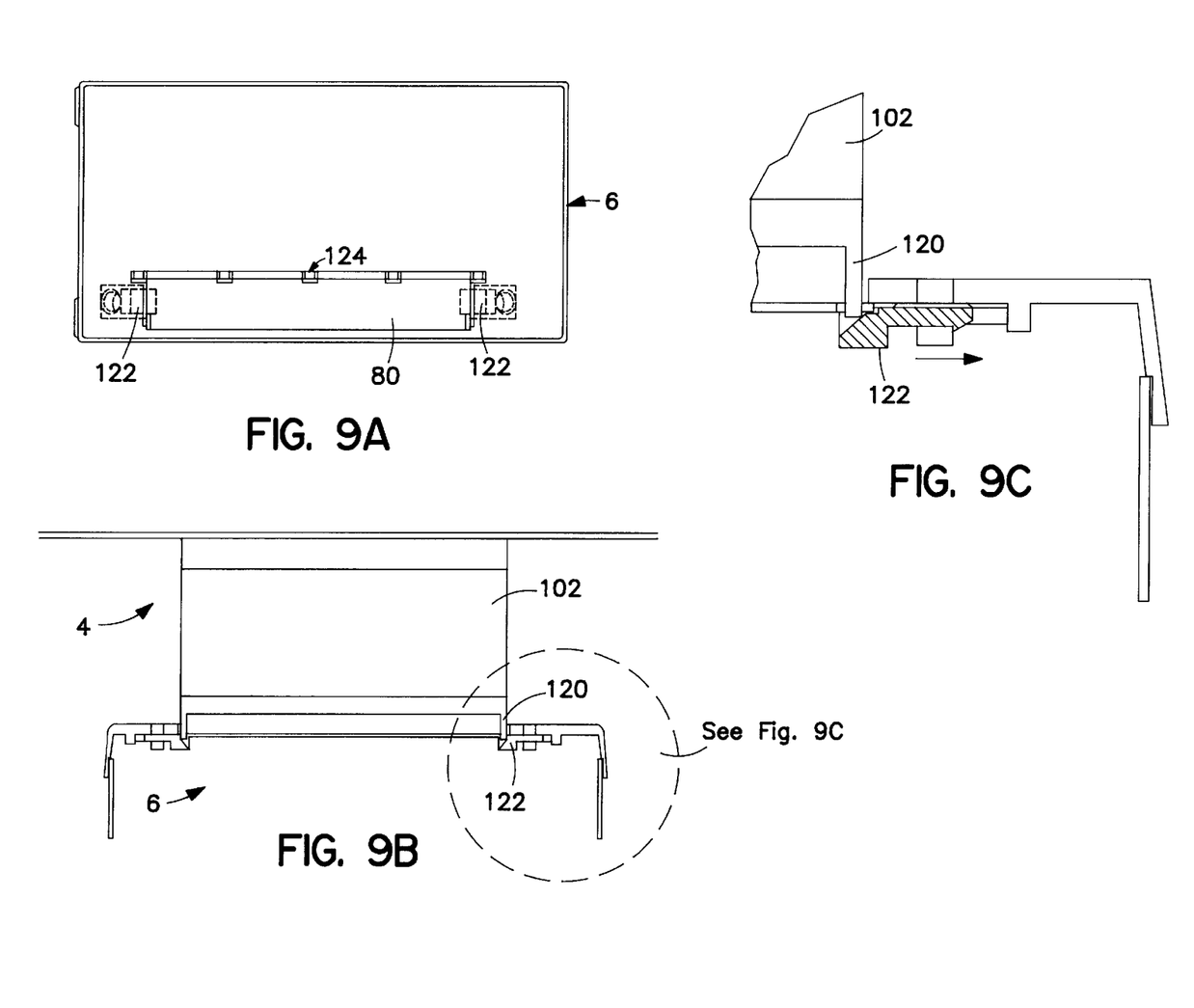
FIGS. 9A, 9B and 9C illustrate a mechanism in the rear of a UPS module for preventing access to electrical connectors therein.

In order to prevent access to the connector 100 inside a UPS module 6 whilst the module is removed from the housing 4 (such as whilst it operates as a stand alone unit), a latched flap 80 is provided, as shown in more detail in FIG. 9. FIG. 9A illustrates a rear view of a UPS module 6, having the latched flap 80 hinged as indicated at 124, and having latches 122 at each end of the flap 80, to hold the flap in a ordinarily latched closed position as shown in FIG. 9B and enlarged FIG. 9C, when the UPS module 6 is installed in the housing 4, a protrusion 120 on the end of the socket connector 102 aligns with the latches 122, which presses against an angled surface of the latch 122 during insertion, so as to unlatch the flap 80 for hinged access to the interior of the module 6.

The ability of the UPS modules 6 to be "hot swapped" in and out of the housing 4 is aided by a construction of the connector 100 and socket 102 which facilitates a sequential connection making process. In order to avoid sparking during insertion or removal of a UPS module 6 from the housing 4, the connector 100 and socket 102 are arranged so that an earth connection is made before the active power connections. For example, upon installation of a module 6 into the housing 4, firstly an earth connection is made between the connector 100 and socket 102. The making of the earth connection is sensed by the micro controller 38 in the module 6, which ensures that the power connections to the circuitry of module 6 are turned off, such as by opening power output relay 62 and battery charging relay 44. Instead of sensing the making of a connection to the earth line, a separate connection may be provided on the connector 100 and socket 102, for the purposes of indicating to the module 6 that the power circuits of the module should be turned off. As the connector 100 is further inserted into the socket 102, the active power connections (line and neutral) are made, but because the power circuits of the module are not activated, no substantial current flows during the connection to the active terminals so as to avoid sparks or arcing. A final connection is then made to indicate to the module 6 that the power circuits can be turned on. During removal of the module 6 from the housing 4, the sequence described above is reversed, and once again the power circuits of the module are inactive at the time when the active connections are broken.

One way in which the connections as between the connector 100 and socket 102 can be sequenced as described above, is to provide the printed circuit board tracks which form contacts on the connector 100 with staggered ends at the edge of the connector 100 which is inserted in the socket. An arrangement of this type is illustrated in the connector 100 shown in FIG. 8. For example, the contact strip indicated by reference numeral 101A may comprise an earth connection for the module 6, and this contact strip terminates closest the end of the connector 100 which is inserted in the aperture 106 of the socket. Thus, as can be readily ascertained, contact would be made with contact strip 101A first, then 101B, strips 101C, and finally contact strip 101D, as the connector 100 is inserted in the socket. Alternatively, the physical edge of the connector 100 which is inserted in the socket may itself be staggered, such that contact is made with the slidable elements 108 in a staggered fashion as the connector is inserted. In another alternative, the contact strips on the connector 100 may all be of the same length, and the slidable elements 108 constructed so as to have surfaces at different heights as between the slidable elements for the different contacts, such that the edge of connector 100 presses against the slidable elements of different surface heights in a sequential manner as the connector is inserted.

In the event that all of the UPS modules 6 have been removed from the housing 4 at the same time, the housing 4 may also be provided with a bypass circuit, which detects the absence of all modules 6, and directly couples the power in and power out connections 10, 12 so as to ensure that electrical power is still provided to the electrical apparatus connected thereto. In the absence of all of the modules 6, if an interruption occurs in the mains electrical power source then an interruption will similarly occur at the electrical apparatus.

Figure 11:
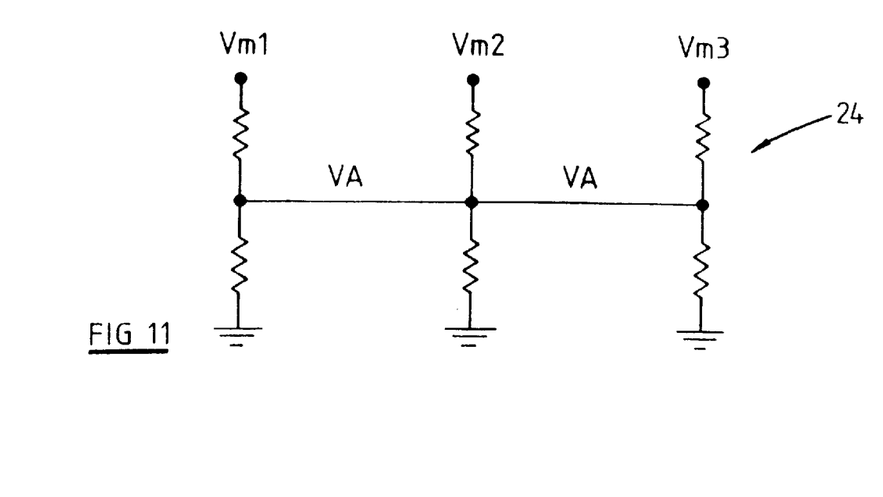
FIG. 11 is a schematic diagram of an impedance network for processing control signals.

Referring to FIG. 11, there is shown a simple circuit for affecting the majority decision capability of the modules 6 installed in the housing, wherein each microcontroller 38 provides a voltage based control signal ($V_{m1}$, $V_{m2}$, and $V_{m3}$) on the control bus 20 (FIG. 2). The control signals are provided as input to the impedance network 24 shown in FIG. 11, which is provided in the housing 4. The resulting voltage $V_A$ at the central node of the impedance network then represents an averaging of the control signals provided by each of the modules, to which a threshold determination is applied in order to determine the logic state output by the majority of the modules 6. The resulting thresholded signal is provided back to the modules 6 on control bus 22 (FIG. 2).

Figures 10A, 10B, 10C, 10D:
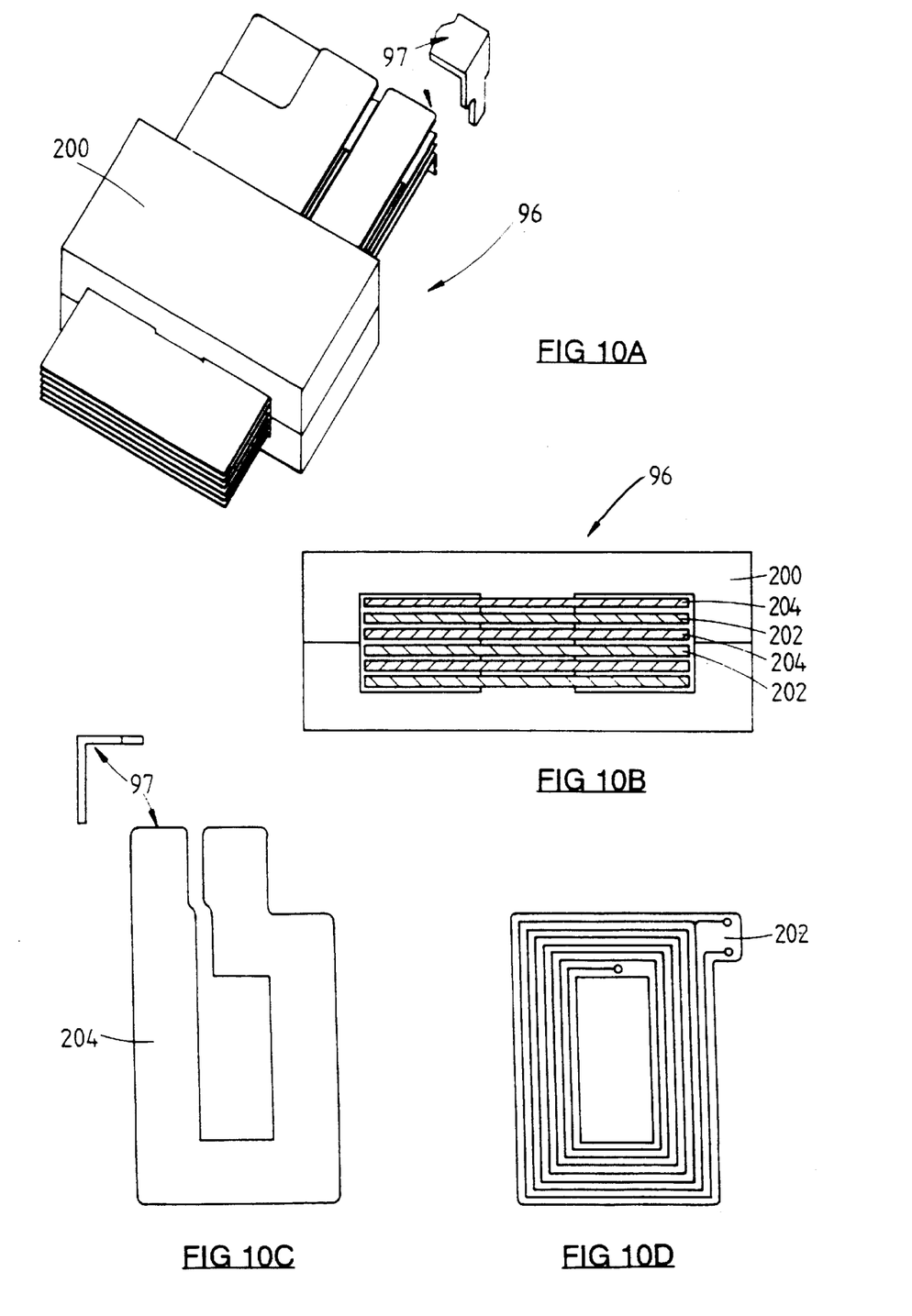

A transformer 96 of the type employed in a preferred form of the UPS module 6 is illustrated in FIG. 10, having a generally conventional ferrite core 200. Instead of employing wound copper wires for the coils of the transformer, however, the transformer 96 is constructed with coils formed either of tracks on a printed circuit board 202, or from stamped metal sheeting 204. Ends 97 of the stamped coils may be formed with terminals and bent transverse to the coil plane enable ease of connection to a circuit board. The resulting transformer 96 has a low profile, since the coils 202, 204 are relatively flat. As indicated in a cross-sectional view of the transformer 96, the coils 202, 204 are alternated with insulative layers (not shown). A transformer of this type need not utilised both stamped copper foil coils and printed circuit board coils, but may employ exclusively either one or the other. These flit transformers are employed in, for example, the AC/DC booster 30, DC/AC inverter 40, charger 34 and DC/DC inverter 36, which are otherwise of generally conventional construction. The power rating for the transformers is around 700 watts, operating at around 6 to 20 kilohertz.

The foregoing detailed description of the invention has been presented by way of example only, and many variations will be apparent to those skilled in the art within the scope of the invention defined in the appended claims.

What is claimed is:

1. An uninterruptable power supply for receiving mains electrical power and supplying an electrical apparatus, comprising:
    a housing adapted to receive a plurality of uninterruptable power supply modules, the housing including a mains power input operatively coupled to receive said mains electrical power and an electrical power outlet operatively coupled to said electrical apparatus;
    at least one said uninterruptable power supply module, the module including an energy storage device;
    a charging circuit coupled to the energy storage device and operatively coupled via said housing to receive said mains electrical power for storing energy therefrom in the energy storage device;
    a power supply circuit coupled to the energy storage device and operatively coupled via said housing to receive said mains electrical power, and operatively coupled for supplying electrical power to the electrical apparatus via the electrical power outlet in said housing;
    a control circuit coupled to the power supply circuit and arranged to control the power supply circuit so as to selectively provide electrical power, in use, to the electrical apparatus from the source of the mains electrical power or from the energy storage device; and
    coupling means adapted to electrically couple the uninterruptable power supply module to the mains power input and the electrical power outlet of said housing when the uninterruptable power supply module is received therein,
    wherein said housing is constructed so that each of said at least one uninterruptable power supply module which is received in said housing is coupled to operate in parallel with each other uninterruptable power supply module therein.

2. An uninterruptable power supply as claimed in claim 1, wherein the coupling means comprises a plug or socket connector, and wherein the housing is provided with a plurality of reciprocal sockets or plugs each adapted to interface with a respective said uninterruptable power supply module and having electrical interconnections therebetween for the parallel connection of modules when received in the housing.

3. An uninterruptable power supply as claimed in claim 2, the housing having a plurality of docking bays each adapted to receive a said uninterruptable power supply module, each of said docking bays being provided with a said reciprocal socket or plug.

4. An uninterruptable power supply as claimed in claim 2 or 3, wherein the housing includes a bypass circuit adapted to supply electricity from the mains power input to the electrical power outlet in the absence of uninterruptable power supply modules in the housing.

5. An uninterruptable power supply as claimed in claim 4, wherein each said coupling means and housing reciprocal socket or plug connector facilitate predetermined sequential connection and disconnection of a plurality of electrical connections between the module and housing during respective insertion and removal of the module into and from the housing.

6. An uninterruptable power supply as claimed in claim 1, wherein said coupling means includes at least one signal line for coupling said control circuit in use to the control circuit of at least one other module,
    said control circuit including
        an alert signal issue circuit for issuing an alert signal on the at least one control line upon detection of a fluctuation of said mains electrical power,
        a circuit for receiving a majority alert signal on said at least one signal line, and
        a circuit for controlling the power supply circuit to provide power, in use, to the electrical apparatus on the basis of said majority alert signal.

7. An uninterruptable power supply as claimed in claim 6, wherein the housing includes a plurality of electrical connectors for making connection to the at least one signal line of respective modules when received in the housing, at least one said module connected to a respective said electrical connector, and a control signal processing circuit for receiving a binary alert signal from the or each module received in the housing and issuing said majority alert signal indicative of the majority binary state of the or each received alert signal.

8. An uninterruptable power supply as claimed in claim 7, wherein said control signal processing circuit comprises an impedance network for averaging the or each received binary alert signal, and a threshold circuit for producing said majority alert signal from the averaged alert signal.

9. An uninterruptable power supply as claimed in claim 1,
    wherein the at least one uninterruptable power supply module is constructed with electronic components of at least one of the charging circuit power supply circuit comprising a first group of components requiring relatively large heat dissipation and a second group of components requiring relatively small heat dissipation, and
    wherein said first group of components are mounted on a ceramic substrate and wire bonded to connection pads of metal foil interconnection tracks laminated onto said substrate.

10. An uninterruptable power supply as claimed in claim 9, wherein said first group of components are mounted on a first side of said substrate and covered with a conformal coating, and a heatsink is mounted to a second side of the substrate opposite said first side.

11. An uninterruptable power supply as claimed in claim 10, wherein said printed circuit board containing said second group of components is mounted in a facing relationship to said first side of said substrate, and wherein wire terminal inserts are provided extending between the printed circuit board and substrate for electrical interconnection therebetween.

12. An uninterruptable power supply as claimed in claim 1, wherein voltage conversion circuitry of said power supply circuit comprises at least one transformer having windings formed from a printed circuit board and stamped metallic foil.

13. An uninterruptable power supply as claimed in claim 1, wherein each said module is capable of stand-alone operation and includes
  a module power input adapted to, in use, provide the source of mains electrical power for the respective module, and
  a power output adapted to, in use, supply electrical power to the electrical apparatus when the module is separated from said housing.

14. An uninterruptable power supply as claimed in claim 1, wherein each uninterruptable power supply module can be individually or collectively inserted and/or removed from said housing without interrupting the supply of power to the electrical apparatus, in use.

15. An uninterruptable power supply as claimed in claim 14 and adapted to allow each uninterruptable power supply module to be inserted and/or removed from the housing, thereby forming and/or breaking its parallel electrical connection with any other modules in the housing, irrespective of whether electrical power is at the time supplied to the electrical apparatus from the source of mains electrical power or from said energy storage device(s).

16. An uninterruptable power supply as claimed in claim 1, wherein the coupling means comprises a plug connector having a plurality of electrical contacts, and wherein a socket provided in the housing is adapted to make electrical connection with the contacts of the plug connector when the respective module is received in the housing, the plug connector and socket being constructed such that, during insertion or removal of the module from the housing, sequential connection is made to respective ones of the electrical contacts so as to enable the module to be inserted or removed from the housing irrespective of the source of the electrical power supplied to the electrical apparatus.

17. A method for providing an uninterruptable power supply to an electrical apparatus, comprising:
  providing a housing containing a plurality of individually operable uninterruptable power supply modules,
  providing a power input in the housing for connection to a mains electricity source;
  providing a power output in the housing for connection to the electrical apparatus;
  providing electrical energy storage means in at least one of the modules;
  providing parallel power bus connections in the housing for connection of the power input and power output to the individual modules;
  providing each of the modules with a sensing means for sensing a fluctuation in the mains electricity and outputting a corresponding alert signal,
  wherein alert signals received from each module are processed in the housing to produce a majority alert signal which is provided to each module, and
  wherein control circuits in the modules are responsive to control the supply of power to the power output from either the power input or the electrical energy storage means on the basis of the majority alert signal.

18. A method as claimed in claim 17, wherein said alert signals are processed by averaging the alert signals over the number of modules and applying a threshold thereto to produce said majority alert signal.

19. A method as claimed in claim 17, including the insertion into, or removal from said plurality of uninterruptable power supply modules, one or more modules into or from said housing without interrupting the supply of electrical power, in use, to the electrical apparatus.

* * * * *